United States Patent Office 3,157,640
Patented Nov. 17, 1964

3,157,640
D-(—)-α-AMINOBENZYLPENICILLIN
TRIHYDRATE
David A. Johnson, Fayetteville, and Glenn A. Hardcastle, Jr., Syracuse, N.Y., assignors to Bristol-Myers Company, New York, N.Y., a corporation of Delaware
No Drawing. Filed Mar. 21, 1963, Ser. No. 266,897
1 Claim. (Cl. 260—239.1)

This invention relates to a new synthetic compound of value as an antibacterial agent, as a nutritional supplement in animal feeds, as an agent for the treatment of mastitis in cattle, as a therapeutic agent in poultry and animals, including man and in the treatment especially of infectious diseases caused by Gram-positive and Gram-negative bacteria. More particularly, this invention relates to D-(—)-α-aminobenzylpenicillin trihydrate.

Antibacterial agents such as benzylpenicillin have proved highly effective in the past in the therapy of infections due to Gram-positive bacteria, but such agents suffer from the serious drawbacks of being ineffective against numerous strains of bacteria, e.g. most Gram-negative bacteria. The compound of the present invention is particularly useful in that it possesses potent antibacterial activity against both Gram-positive and Gram-negative bacteria upon either parenteral or oral administration and also exhibits resistance to destruction by acid.

D-(—)-α-aminobenzylpenicillin is known in the technical literature, having been described, for example, in United States Patent No. 2,985,648, the disclosure of which is incorporated herein by reference. According to the teachings of that patent, this penicillin is prepared by reaction of 6-aminopenicillanic acid with an acylating agent such as the acid chloride, acid bromide, acid anhydride, mixed anhydride, etc. of a derivative of D-(—)-α-aminophenylacetic acid in which the amino group is protected by a carbobenzoxy or other suitable protecting group. After completion of the acylation reaction, the protecting group is removed from the amino group such as by reduction with hydrogen in the presence of a catalyst.

The known methods for the preparation of D-(—)-α-aminobenzylpenicillin by the acylation of 6-aminopenicillanic acid result in the preparation of aqueous mixtures which contain, in addition to the desired penicillin, unreacted 6-aminopenicillanic acid, hydrolyzed acylating agent, and products of side reactions such as the products of the acylating agent reacted with itself and/or with the desired penicillin, as well as other impurities. The D-(—)-α-aminobenzylpenicillin may then be recovered from the aqueous reaction mixture by concentration to small volume and recovering the product by filtration. However, due to the fact that anhydrous D-(—)-α-aminobenzylpenicillin is soluble in water to the extent of about 20–25 mg./ml. at 20–25° C., it is very difficult to recover the product in high yields. Furthermore, the recovered D-(—)-α-aminobenzylpenicillin may be obtained in the form of a monohydrate. The monohydrates (as well as the dihydrates) of D-(—)-α-aminobenzylpenicillin possess poor biological stability.

It is an object of this invention to provide a new form of D-(—)-α-aminobenzylpenicillin which is relatively insoluble in water, which is obtained from the acylation reaction mixture in high yields, and which possesses high biological stability.

These and other objects are achieved by the practice of this invention which, briefly comprises providing the trihydrate of D-(—)-α-aminobenzylpenicillin.

The D-(—)-α-aminobenzylpenicillin trihydrate of this invention can be obtained by contacting, at a temperature not above 60° C., an acid addition salt of D-(—)-α-aminobenzylpenicillin with an amine in a water-immiscible solvent containing at least 3 moles of water per mole of such penicillin, said amine having the formula

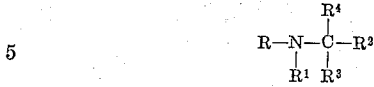

wherein R is an aliphatic group having from 10 to 15 carbon atoms, $R^1$ is hydrogen or (lower)alkyl and $R^2$, $R^3$ and $R^4$ are each alkyl groups having in the aggregate a total of from 11 to 14 carbon atoms; to convert the D-(—)-α-aminobenzylpenicillin acid addition salt to its amphoteric form, whereupon D-(—)-α-aminobenzylpenicillin trihydrate precipitates and is collected.

The acid addition salts of D-(—)-α-aminobenzylpenicillin include the mineral acid addition salts such as the hydrochloride, hydrobromide, hydroiodide, sulfate, sulfonate and phosphate and the organic acid addition salts such as the maleate, acetate, citrate, oxalate, succinate, benzoate, tartrate, fumarate, malate, mandelate, ascorbate and the like. In a preferred embodiment, D-(—)-α-aminobenzylpenicillin is the salt of an aryl sulfonic acid having the formula $R^5SO_3H$ wherein $R^5$ represents a member selected from the group consisting of radicals having the formulae

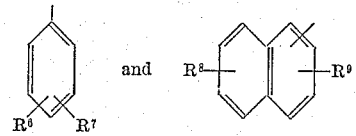

in which $R^6$, $R^7$, $R^8$ and $R^9$ are members selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl. Such aryl sulfonates can be prepared by contacting an aqueous solution of D-(—)-α-aminobenzylpenicillin such as an impure aqueous solution containing D-(—)-α-aminobenzylpenicillin obtained as described in United States Patent 2,985,648, with a water-soluble aryl sulfonic acid or salt thereof having the formula $(R^4-SO_3)_xM$ wherein M is a radical selected from the group consisting of hydrogen, ammonium, substituted ammonium, the alkali metals and the alkaline earth metals, wherein $x$ is a whole number equal to the valence of M and wherein $R^4$ is the same as defined above. Specific aryl sulfonic acids which can be used include naphthalene sulfonic acid, p-nonylbenzene sulfonic acid, p-toluene sulfonic acid and p-cymene sulfonic acid. After reaction, the D-(—)-α-aminobenzylpenicillin aryl sulfonate precipitates and is recovered.

A preferred group of amines of the class described above are those amines and mixtures thereof which have the formula

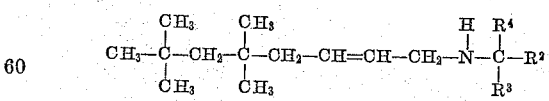

wherein each of $R^2$, $R^3$ and $R^4$ is an aliphatic hydrocarbon radical and wherein $R^2$, $R^3$ and $R^4$ contain in the aggregate from 11 to 14 carbon atoms. Mixtures of the above amines can also be used. These liquid amines and mixtures thereof are added to the solution in their free base form. The amount of such amines which is used will generally vary from about 68 to 250 percent by weight, and preferably from 85 to 150 percent by weight of the D-(—)-α-aminobenzylpenicillin aryl sulfonate. While greater amounts of amine may be used, no significant advantage is obtained by using more than about 250 percent by weight of the D-(—)-α-aminobenzylpenicillin aryl sulfonate.

The water-immiscible solvent in which the acid addition salt of D-(—)-α-aminobenzylpenicillin is contacted with the amine is preferably methyl isobutyl ketone. Other solvents which can be used include other (lower) ketones, (lower)aliphatic esters such as butyl acetate, halogenated (lower)hydrocarbons such as chloroform or methylene chloride, aromatic hydrocarbons such as toluene; (lower)alkyl ethers such as diamylether; and mixtures thereof with each other or with methyl isobutyl ketone. The amount of solvent used is not critical and large amounts of the solvent can be used since D-(—)-α-aminobenzylpenicillin trihydrate is not soluble in these materials. Since the trihydrate of D-(—)-α-aminobenzylpenicillins is also relatively insoluble in water, a considerable amount of water can be present in the system without reducing the yield of the desired product to any great extent.

In order to obtain D-(—)-α-aminobenzylpenicillin trihydrate it is essential to contact the D-(—)-α-aminobenzylpenicillin acid addition salt with the amine at temperatures below 60° C. If temperatures in excess of 60° C. are employed, anhydrous D-(—)-α-aminobenzylpenicillin is formed. The preferred temperature for contacting the D-(—)-α-aminobenzylpenicillin acid addition salt with the amine in order to form the trihydrate thereof is from about 0 to 35° C. Crystallization of the D-(—)-α-aminobenzylpenicillin trihydrate can be initiated if necessary by seeding. After precipitation of the product is completed, it is recovered by any suitable means, such as by filtration. The product can then be washed with an organic solvent such as methyl iosbutyl ketone or water and subsequently dried.

In accordance with this invention, that form of D-(—)-α-aminobenzylpenicillin which is determined by analysis to contain from about 12 to 15 percent by weight of bound water (i.e., water combined in the molecular form) is considered to be the trihydrate. That form of D-(—)-α-aminobenzylpenicillin which is determined by analysis to contain less than about 3 percent by weight of moisture is considered to be the anhydrous form. The monohydrate and dihydrate of D-(—)-α-aminobenzylpenicillin are considered to be those forms which are determined by analysis to contain from about 3 to 12 percent by weight of bound moisture.

D-(—)-α-aminobenzylpenicillin trihydrate is relatively insoluble in water (i.e. less than about 10 mg./ml. at 20 to 25° C.), and is less soluble than D-(—)-α-aminobenzylpenicillin, and is obtained in much higher yields from aqueous systems than the corresponding anhydrous D-(—)-α-aminobenzylpenicillin. Moreover, due to the low water solubility of D-(—)-α-aminobenzylpenicillin trihydrate, this compound can be prepared from lower quality D-(—)-α-aminobenzylpenicillin aryl sulfonate systems than can anhydrous D-(—)-α-aminobenzylpenicillin since the water content of the system can be substantially increased (thereby dissolving more of the impurities) without substantially lowering the yield of the D-(—)-α-aminobenzylpenicillin trihydrate.

D-(—)-α-aminobenzylpenicillin trihydrate has an elegant and more crystalline appearance than does the corresponding anhydrous compound. Moreover, it may be stored for long periods of time without substantal potency loss. Furthermore, D-(—)-α-aminobenzylpenicillin trihydrate is easier to formulate into aqueous suspensions for use orally or by injection than the corresponding anhydrous compound since it has better wettability properties.

The following examples will serve to illustrate this invention without limiting it thereto.

*Example 1*

To a vigorously agitated mixture of 100 mls. of methyl isobutyl ketone there are added at 25 to 30° C. 15 mls. of water and 10 mls. of a mixture of secondary amines wherein each secondary amine has the formula

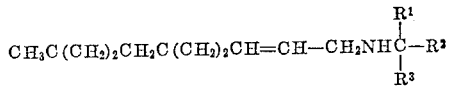

wherein each of $R^1$, $R^2$ and $R^3$ is an aliphatic hydrocarbon radical and wherein $R^1$, $R^2$ and $R^3$ contain in the aggregate of from 11 to 14 carbon atoms. This particular mixture of secondary amines, which is sometimes referred to as "Liquid Amine Mixture No. I," is a clear amber liquid having the following physical characteristics: viscosity at 25° C. of 70 cps.; specific gravity at 20° C. of 0.845; refractive index at 25° C. of 1.467; distillation range at 10 mm.: up to 160° C.—4%, 160 to 210° C.—5%, 210 to 220° C.—74%, above 220° C.—17%. To this mixture there is then added slowly over a period of 30 minutes 10 gms. of D-(—)-α-aminobenzylpenicillin beta-naphthalene sulfonate. The mixture is agitated for three hours at 25–30° C. The product, D-(—)-α-aminobenzylpenicillin trihydrate, precipitates and is collected by filtration. The filter cake of the product is washed several times with methyl isobutyl ketone and is dried at 40° C. The product is obtained in about a 90% yield and has a potency of 865 mcgs./mg. It is determined by Karl Fischer analysis to have a moisture content of 13.4% by weight.

*Example 2*

In order to illustrate the biological stability of D-(—)-α-aminobenzylpenicillin trihydrate, 18 samples of this compound are stored at room temperature in snap-cap vials. After three to four months, the average potency loss is determined to be only 0.2%. By contrast, two samples of D-(—)-α-aminobenzylpenicillin containing 6.4% and 7.6% by weight of water which are stored at room temperature for the same length of time as the samples of D-(—)-α-aminobenzylpenicillin trihydrate are determined to lose 60% and 55%, respectively, of their potency.

We claim:

D-(—)-α-aminobenzylpenicillin trihydrate.

References Cited by the Examiner
UNITED STATES PATENTS
2,985,648  5/61  Doyle _____ 260—239.1

IRVING MARCUS, *Primary Examiner.*
NICHOLAS S. RIZZO, *Examiner.*